United States Patent [19]
Van Duyn

[11] Patent Number: 5,823,739
[45] Date of Patent: *Oct. 20, 1998

[54] CONTAINMENT CASE FOR A TURBINE ENGINE

[75] Inventor: Keven G. Van Duyn, Bloomfield, Conn.

[73] Assignee: United Technologies Corporation, Hartford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 675,765

[22] Filed: Jul. 3, 1996

[51] Int. Cl.⁶ ..................................................... F01D 21/00
[52] U.S. Cl. ................................................................ 415/9
[58] Field of Search .................................................. 415/9

[56] References Cited

U.S. PATENT DOCUMENTS

| | | | |
|---|---|---|---|
| 3,708,242 | 1/1973 | Bruneau et al. | 415/217 |
| 3,974,313 | 8/1976 | James | 428/176 |
| 4,135,851 | 1/1979 | Bill et al. | 415/174 |
| 4,397,608 | 8/1983 | Husain et al. | 415/9 |
| 4,475,864 | 10/1984 | Patacca et al. | 415/9 |
| 4,639,188 | 1/1987 | Swadley | 415/9 |
| 5,040,946 | 8/1991 | Caoduro | 415/182.1 |
| 5,163,809 | 11/1992 | Akgun et al. | 415/9 |
| 5,259,724 | 11/1993 | Liston et al. | 415/9 |
| 5,403,148 | 4/1995 | Forrester | 415/9 |

FOREIGN PATENT DOCUMENTS

WO 86/03549  6/1986  WIPO .
WO 96/19640  6/1996  WIPO .

*Primary Examiner*—John T. Kwon
*Attorney, Agent, or Firm*—Kenneth C. Baran

[57] ABSTRACT

A containment case (130) for a turbine engine circumscribes an array of rotatable blades and comprises a penetration resistant containment ring (152) and an impact isolator (138a, 138b) extending from the containment ring. The containment case has an impact zone (136) which is the region where any blade fragment which separates from a blade is anticipated to strike the containment case. The containment ring is axially coincident with the impact zone, and the impact isolator is axially spaced from the impact zone. In one embodiment, The impact isolator is a circumferentially extending convolution. During operation, the impact isolator protects the integrity of a connection (139, 141) between the containment case (130) and an adjacent case (62, 64) and reduces the severity of forces transmitted to components (108) mounted on the case.

6 Claims, 3 Drawing Sheets

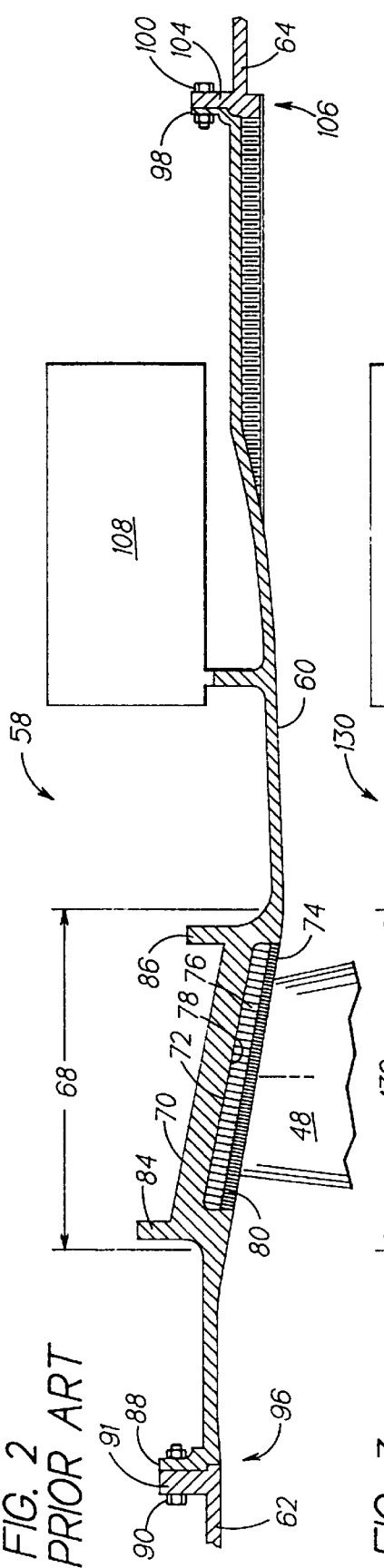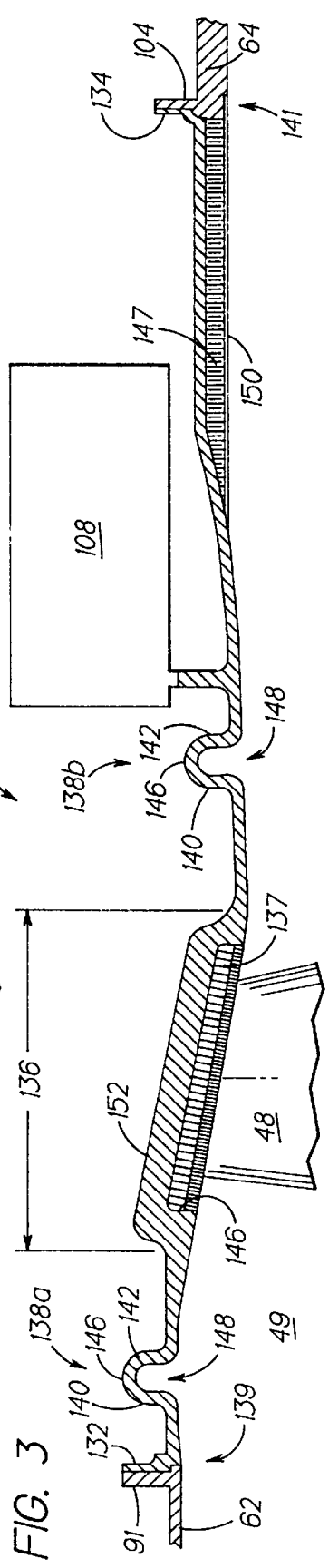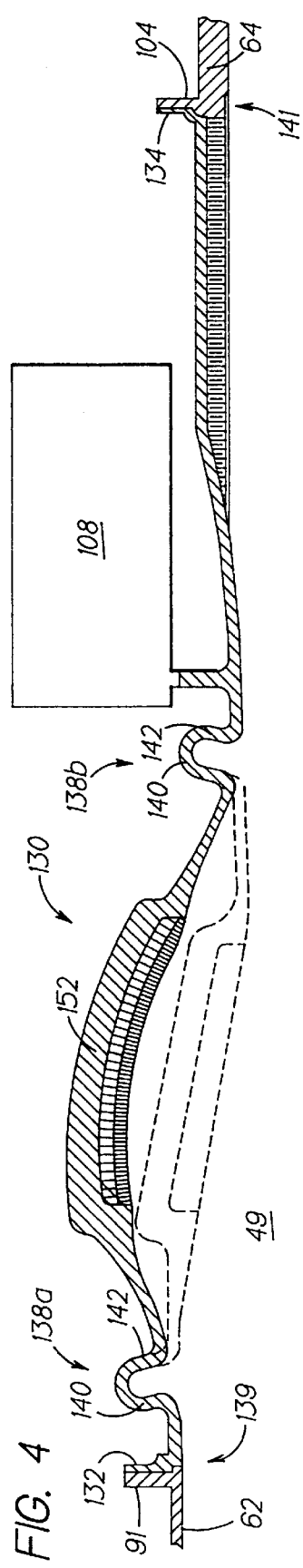

CONTAINMENT CASE FOR A TURBINE ENGINE

TECHNICAL FIELD

This invention relates to turbine engines having rotatable blade arrays and particularly to a containment case for confining blade fragments which may become separated from a blade during engine operation.

BACKGROUND OF THE INVENTION

Gas turbine engines, such as those which power commercial aircraft, typically include multiple arrays of fan, compressor and turbine blades. Each blade array comprises a multitude of blades which are attached to and extend radially outwardly from a hub. During engine operation each hub and associated blade array rotate about a longitudinally extending central axis. A nonrotating case, which is typically cylindrical or frustoconical in shape, circumscribes the tips of the blades and is radially spaced therefrom by a small amount. The case has a leading edge and a trailing edge, at least one of which is connected to an adjacent engine case. The case defines the outer boundary of a flowpath which extends longitudinally through the engine.

During engine operation, it is possible for a blade fragment to become separated from a blade. Separation of a blade fragment is rare and is usually attributable to blade damage arising from the unpreventable entry of foreign objects into the engine flowpath. Because the kinetic energy of a blade fragment is considerable (particularly if the fragment comprises substantially the entire blade and/or is expelled when the hub and blades are turning at a high rotational speed) the fragment is capable of damaging engine and airplane components which lie along the fragment's trajectory. To prevent such damage, the case which circumscribes a blade array is designed to confine or contain a blade fragment and is commonly referred to as a containment case.

One type of containment case is known as a softwall case. A softwall case comprises multiple layers of a light weight penetration resistant fabric wrapped around a rigid but penetrable support ring. A separated blade fragment will penetrate the support ring but be contained by the fabric. Softwall construction is expensive, but is also light weight, a distinct advantage in an aircraft application. A second type of case, known as a hardwall case, comprises a ring having sufficient radial thickness to resist penetration of a blade fragment. The choice of hardwall or softwall construction depends largely on the case diameter. For a large diameter case, hardwall construction is prohibitively heavy, and therefore softwall construction, despite being expensive, is preferred. For a small diameter case, the radial thickness required for penetration resistance imposes only a modest weight penalty and so the less expensive hardwall construction is usually favored.

Although hardwall construction is almost universally preferred for small diameter cases, it is not without several disadvantages. First, the thickness and rigidity of a hardwall case prevent it from deflecting readily when struck by a blade fragment. Consequently, the full force of the impact is concentrated over a very short time interval and therefore is quite damaging. The abruptness and resultant severity of the impact contribute to the required thickness of the case and therefore to its weight. In addition, the severe impact energy is transmitted to auxiliary components, such as engine control units and pneumatic lines which may be attached to the exterior of the engine (and especially to the exterior of the containment case), thereby exposing those components to potentially damaging forces.

A second disadvantage of a conventional hardwall containment case is that, to the extent the containment case does deflect during an impact, axially directed forces are developed in the containment case. These forces pull the leading and trailing edges of the containment case toward the impact site thereby imposing tensile stresses on the connections between the containment case and the adjacent cases. Finally, the cylindrical or frustoconical shape of a conventional containment case readily conducts a pulse of shear energy axially away from the impact site so that the pulse imposes shearing stresses on the case connections. The case connections are constructed with sufficient strength to withstand these tensile and shearing stresses, but the strength is accompanied by additional, undesirable weight.

SUMMARY OF THE INVENTION

It is, therefore, an object of the invention to contain a separated blade fragment in a turbine engine with a containment case which minimizes the weight of the engine.

It is another object of the invention to minimize the impact energy imparted to components mounted on the exterior of the containment case.

According to the invention, a containment case for a turbine engine includes a penetration resistant containment ring axially coincident with an impact zone and an impact isolator extending from the containment ring and axially spaced from the impact zone. In the event that a separated blade fragment strikes the containment ring, the impact isolator minimizes the stresses imposed on the connections between the containment case and adjacent cases. The impact isolator also minimizes the effect of the impact on components mounted on the exterior of the containment case.

In one embodiment of the invention, the isolator is a circumferentially extending convolution comprising a pair of legs rising from the containment case and joined together by a ridge so that the legs and ridge define a trough which opens into the engine flowpath. In another embodiment, a noise suppressing liner is disposed in the trough to minimize noise emissions from the engine.

The primary advantage of the invention is the reduced weight associated with the case connections as a result of minimizing the stresses imposed on those connections by the impact of a blade fragment. A second advantage is the reduced risk of damage to components mounted on the exterior of the engine, and particularly those mounted on the containment case.

These advantages and the features and operation of the invention will become more apparent in light of the following description of the best mode for carrying out the invention and the accompanying drawings.

BRIEF DESCRIPTION OF THE DRAWINGS

FIG. 2 is a cross sectional side view of a conventional fan containment case for a turbine engine of the general type shown in FIG. 1.

FIG. 3 is a cross sectional side view of a fan containment case having a containment ring and an impact isolator according to the present invention.

FIG. 4 is a cross sectional view similar to that of FIG. 3 illustrating the fan containment case of the present invention deflected due to a blade fragment impact and also showing the undeflected case in phantom.

BEST MODE FOR CARRYING OUT THE INVENTION

This invention is predicated in part on the recognition that tensile and shearing stresses are a significant threat to the integrity of the connections between a turbine engine containment case and adjacent cases during a blade fragment impact, and that the weight of the connections can be minimized by isolating the connections from those stresses.

Figure 1:
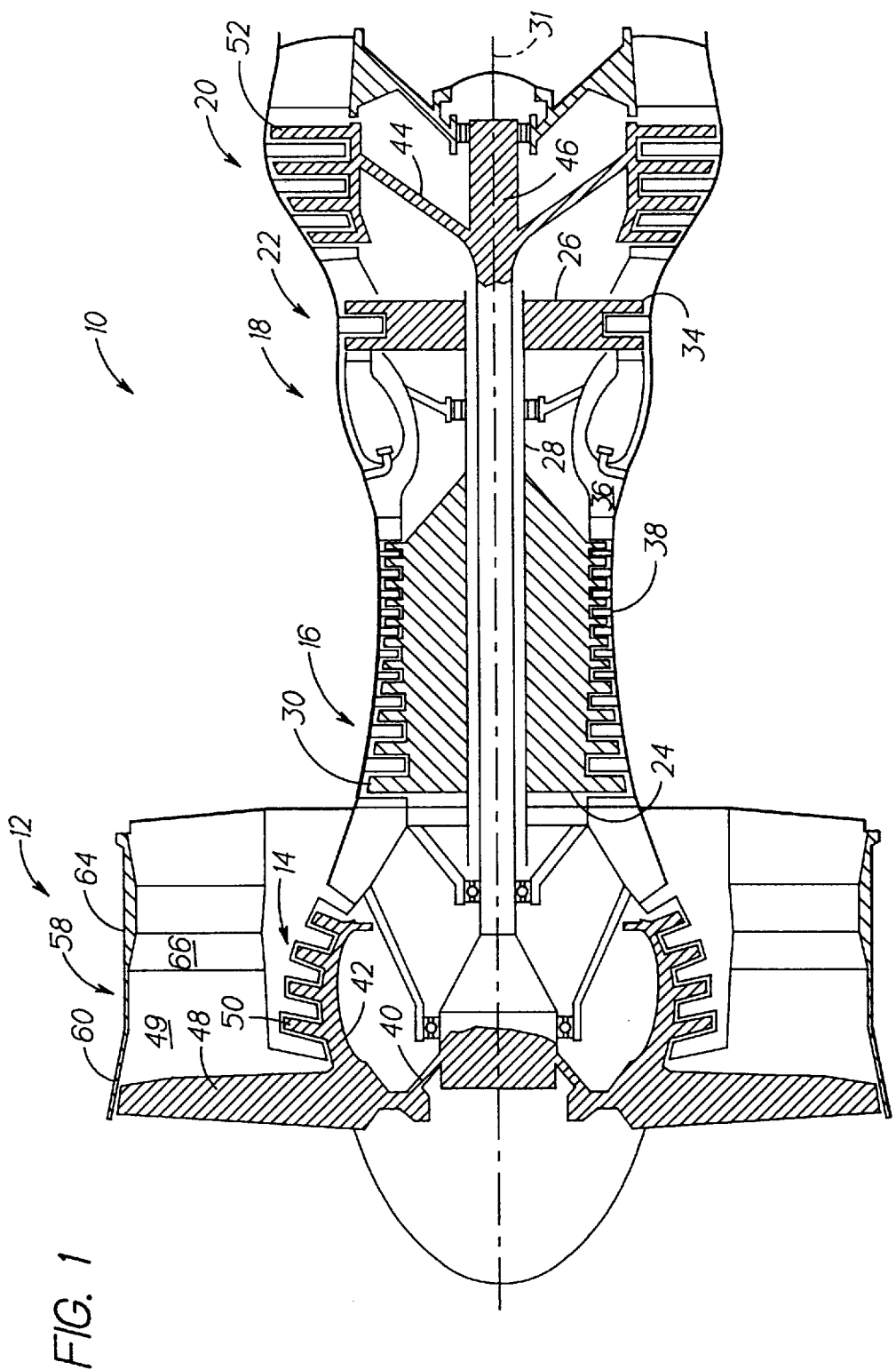
FIG. 1 is a schematic, cross sectional side view of an aircraft gas turbine engine.

Referring to FIG. 1, a modern aircraft gas turbine engine 10 includes a fan 12, low pressure and high pressure compressors 14, 16, a combustion chamber 18, and low pressure and high pressure turbines 20, 22. A high pressure rotor comprises a high pressure compressor hub 24 and a high pressure turbine hub 26 connected together by a shaft 28, and arrays of blades, such as representative compressor and turbine blades 30, 34. The blades extend radially outwardly from their respective hubs, across a primary flowpath 36, and into close proximity with a primary or core case assembly 38. Similarly a low pressure rotor comprises fan, low pressure compressor and low pressure turbine hubs 40, 42, 44 connected together by shaft 46 and arrays of blades such as representative fan, low pressure compressor and low pressure turbine blades 48, 50, 52. Blades 48, 50, 52, extend radially outwardly from their respective hubs, across the primary flowpath and, in the case of the fan blades 48, across a secondary flowpath 49 as well, and into close proximity with the core case assembly 38, or a fan case assembly 58. The case assemblies define the outer flowpath boundaries for the primary and secondary flowpaths.

During engine operation, the turbines rotatably drive the fan and compressors about a longitudinally extending central axis 31. Since a hazardous blade fragment, which may comprise substantially an entire blade, can become separated from the rotor during engine operation, the case assemblies have sufficient thickness, and therefore strength, to contain such a fragment. Throughout much of the engine, adequate case thickness usually does not contribute an objectionable amount to the weight of the engine. The fan case, however, contributes disproportionately to the weight of the engine since the fan case must be thick enough, and the connections to the adjacent cases strong enough, to absorb the immense kinetic energy of a large fan blade 48. The contribution to engine weight is amplified by the large diameter of the case. It is, therefore, desirable to minimize the weight of the fan case assembly without compromising its containment capability or the integrity of its connections to adjacent cases.

Referring to FIG. 2, a conventional fan case assembly 58 includes a containment case 60 which circumscribes an array of fan blades 48 and an exit case 64 which circumscribes and is connected to an array of nonrotating fan exit guide vanes 66 (FIG. 1). The containment case has an impact zone 68 which is the region where a separated blade fragment is anticipated to strike the containment case. A containment ring 70 having sufficient thickness and rigidity to absorb the impact of a blade fragment is axially coincident with the impact zone. The containment case typically includes an airseal 72 comprising an abradable layer 74 bonded to a substrate 76 which, in turn, is bonded to the floor 78 of a circumferentially extending channel 80. Stiffening rings 84, 86 provide additional stiffness to the case. A forward flange 88 at the leading edge of the containment case is connected by fasteners (usually bolts and nuts) 90 to a flange 91 on inlet case 62 to form a connection 96 between the cases. Similarly, an aft flange 98 at the trailing edge of the containment case is connected by fasteners 100 to a flange 104 on the fan exit case to form a connection 106 between the containment case and the exit case. External components, such as schematically illustrated electronic engine control unit 108, may be attached to the containment case or to other engine cases.

In the event that a separated blade fragment strikes the containment case during engine operation, the containment ring, owing to its thickness and rigidity, does not deflect readily. Consequently, the full force of the impact is concentrated over a very short time interval and therefore is quite damaging. The severity of the impact, contributes to the required thickness and weight of the case and transmits a severe and potentially damaging shock to any auxiliary components, such as engine control unit 108, mounted on the exterior of the engine (and especially on the exterior of the containment case). To the extent that the containment case does deflect during an impact, tensile stresses are imposed on the connections 96, 106 between the containment case and the adjacent inlet and exit cases. Moreover, a pulse of shear energy propagates from the impact site to the leading and trailing edges of the case and imposes shearing stresses on the case connections Although the case connections are constructed with sufficient strength to withstand these tensile and shearing stresses, the strength is accompanied by additional, undesirable weight.

FIG. 3 illustrates a fan containment case according to the invention which overcomes these disadvantages. The containment case 130 circumscribes an array of fan blades 48 and is connectable, by forward and aft flanges 132, 134 at the leading and trailing edges respectively of the case, to adjacent cases such as inlet case 62 and exit case 64. Like the conventional containment case of FIG. 2, the containment case of the present invention has an impact zone 136 and may have an airseal 137 disposed in a circumferentially extending channel 146 Airseals of the type illustrated are well known and the airseal does not contribute to the containment capability of the containment case and therefore is not further described herein. A noise suppressing acoustic liner comprising an array 147 of honeycomb cells and a perforated skin 150 absorb objectional acoustic tones. Like the airseal, such acoustic liners are well known, and the liner does not contribute to the containment capability of the case.

The containment case includes a penetration resistant containment ring 152 axially coincident with the impact zone 136 and at least one impact isolator, such as isolator 138a or 138b, integral with the containment ring and axially spaced from the impact zone. As explained more completely below, each impact isolator protects the integrity of the connection between the containment case and the adjacent case in the event that a separated blade fragment strikes the containment case. In the illustrated embodiment isolator 138a protects the connection 139 between the containment case and the inlet case while isolator 138b protects the connection 141 between the containment case and the exit case.

In the preferred embodiment, each impact isolator is a circumferentially extending convolution. The convolution comprises forward and rear legs 140, 142 rising from the containment case at a rise angle α(best seen in FIG. 6) and joined together by a ridge 146. The legs and ridge define a trough 148 which opens into the flowpath 49.

The containment case is manufactured similarly to a conventional containment case in that the local features, such as flanges 132, 134, channel 146 and impact isolators 138a, 138b are machined into a forged case.

Figure 5:
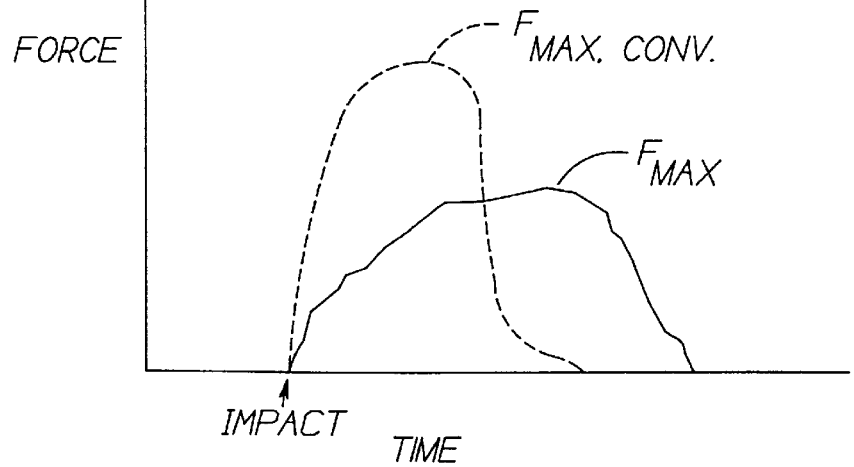
FIG. 5 is a graphical illustration of the duration of and maximum forces associated with a blade fragment impact against both a conventional containment case and a containment case according to the invention.

The operation and advantages of the containment case of the present invention are best understood by reference to FIG. 4 which shows the case in a normal or undeflected condition (phantom) and in the deflected condition which occurs when the containment ring is struck by a separated blade fragment (the blade fragment is not shown, and the case deflection is greatly exaggerated to ensure the clarity of the illustration). During such an occurrence, the legs 140, 142 of each convolution spread apart slightly, enabling the containment ring to deflect and move radially outwardly as seen in the Figure. As a result, and as illustrated in principle in FIG. 5, the duration of this impact is longer than the duration of a similar impact against a conventional containment case. However, the maximum force, $F_{MAX}$ exerted on the case is smaller than the maximum force $F_{MAX,\ CONV}$ exerted on a conventional case. (In more technical terms, the impulse or time integral of the force is equal for both events even though the deflection of containment case 130 lengthens the duration of the event). Accordingly, the blade impact is not as abrupt and severe as a similar impact against a conventional containment case. As a practical consequence, components such as the control unit 108 mounted to the case assembly are less likely to sustain damage.

In order to accommodate the increased deflection of containment ring 152 relative to that of conventional ring 70 without exceeding the ultimate strength of the material from which the case is constructed, ring 152 is made of a more ductile material than is conventional ring 70. The more ductile material may be a material different from that used in a conventional case or it may be the same material, heat treated to increase its ductility. Although a more ductile material typically has a lower ultimate strength than a less ductile material, the accompanying reduction in the maximum force to which the ring is subjected (FIG. 5) ensures that a blade fragment impact will not exceed the ultimate strength of the more ductile material. Thus, no compensatory thickening of containment ring 152 relative to ring 70 is required, and the improved shock isolation of component 108 is achieved without the disadvantage of increased engine weight.

The spreading of the convolution legs 140, 142 also distributes the tensile forces arising from a blade fragment impact more uniformly around the circumference of connections 139, 141. Thus, the tensile forces are minimized on those portions of the connections which are circumferentially proximate to the impact site. The convoluted shape of the impact isolators also impedes the propagation of an energy pulse, which is largely shear in character, from the impact site to the connections. Accordingly, the flanges 132, 134 of the containment case 130, as well as flanges 91, 104 of the inlet and exit cases may be made relatively small and light.

Figure 6:
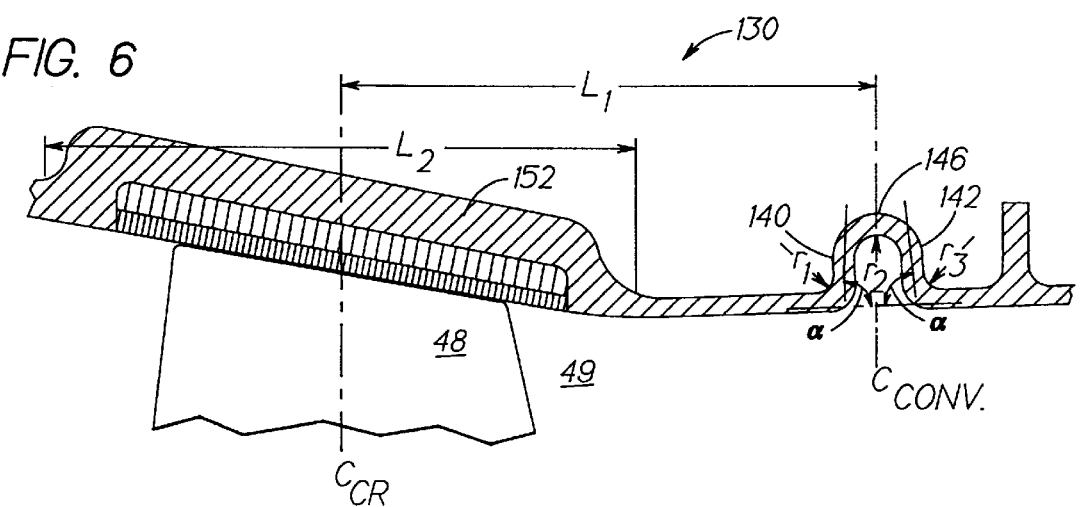
FIG. 6 is an enlarged side view of an exemplary convoluted impact isolator according to the present invention.

Referring now to FIG. 6, certain additional features of an exemplary convolution can now be appreciated. Ideally each convolution has a smoothly flowing, curved profile, devoid of any sharp corners or edges at which stresses can accumulate during a blade fragment impact. In the preferred embodiment, the radii of curvature, $r_1$, $r_2$ and $r_3$ are equal and are as large as possible to ensure manufacturing simplicity, the radii being limited primarily by constraints on the overall axial and radial dimensions of the case. The rise angle α is ideally between approximately 60 degrees and approximately 90 degrees. If the rise angle is significantly less than 60 degrees, the case profile approaches that of a conventional cylindrical or frustoconical case, diminishing the benefits of the convolution. If the rise angle is greater than 90 degrees, the opening of the trough is narrower than the interior of the trough, making the trough unnecessarily difficult and expensive to machine. Finally, the convolution is as close as possible to the containment ring so that the energy pulse propagating away from the impact site is absorbed by the isolator as soon as possible and as close to the impact site as possible. Proximity of the convolution to the containment ring is limited by the strain capability of the material comprising the containment case since the deflection of legs 140, 142 increases with increasing proximity to the containment ring. In the preferred embodiment, the distance $L_1$ from the centerline $C_{CR}$ of the containment ring to the centerline $C_{CONV}$ of the convolution is no more than the axial length, $L_2$ of the containment ring.

Figure 7A:
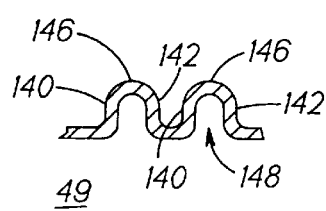
FIG. 7A, 7B and 7C are the cross sectional side views similar to that of FIG. 3 illustrating additional alternative embodiments of a convoluted impact isolator including an isolator having a radially inwardly opening trough with a noise suppressing liner disposed therein.
Figure 7B:
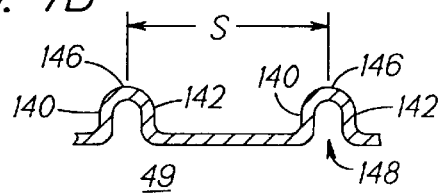
Figure 7C:
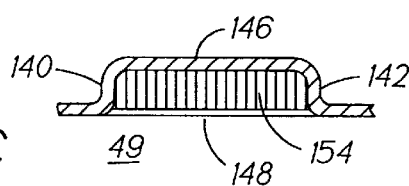

FIG. 7, which is exemplary rather than limiting, shows certain variations on the cross sectional profile and multiplicity of the impact isolating convolutions. As seen in FIG. 7a and 7b, the effectiveness of a single convolution can be augmented by employing multiple convolutions. Multiple convolutions may be arranged in a high density array (FIG. 7a) or may be spaced apart by an amount, s, (FIG. 7b). The effectiveness of a convoluted isolator does not improve in direct proportion to the number of convolutions. Therefore, since each convolution contributes manufacturing complexity, the use of multiple convolutions may not always be advisable. The ridge 146 of each convolution may simply be the juncture of two legs, as seen in FIGS. 7a and 7b or may extend a finite axial distance as seen in FIG. 7c. As also seen in FIG. 7c, a noise suppressing liner may be disposed in trough 148 to absorb undesirable fan noise.

The invention has been described as a containment case for an array of fan blades in a turbine engine. However the invention is equally applicable to the compressor and turbine blade arrays of a turbine engine and to any other type of machinery where it is desirable to confine separated component fragments. The invention has been described as useful for protecting a flanged connection between a containment case and an adjacent case, however other types of connections, such as a weld joint, may be equally well protected by the invention. These and other changes and modifications to the invention can be made without departing from the spirit and scope of the appended claims.

I claim:

1. A containment case for a turbine engine, the turbine engine having a flowpath extending therethrough, a rotor including a hub and an array of rotor blades extending radially outwardly from the hub and across the flowpath, the containment case being connectable to an adjacent engine case and having an impact zone, the containment case characterized by:

a penetration resistant containment ring axially coincident with the impact zone, and at least one impact isolator extending from the containment ring and axially spaced from the impact zone for protecting the integrity of a connection between the containment case and the adjacent case in the event that a separated blade fragment strikes the containment case.

2. The containment case of claim 1, characterized in that the impact isolator comprises a circumferentially extending convolution.

3. The containment case of claim 2, characterized in that the convolution comprises a pair of legs rising from the case and joined together by a ridge, the legs and ridge defining a trough which opens into the flowpath.

4. The containment case of claim 3 characterized by a noise suppressing liner disposed in the trough.

5. The containment case of claim 3 characterized in that each leg has a rise angle which is in the range of approximately sixty degrees to approximately ninety degrees.

6. The containment case of claim 2 characterized in that the containment ring has a length $L_2$, and the convolution is spaced from the containment ring by a distance $L_1$ which is no greater than $L_2$.

* * * * *